Patented Oct. 10, 1939

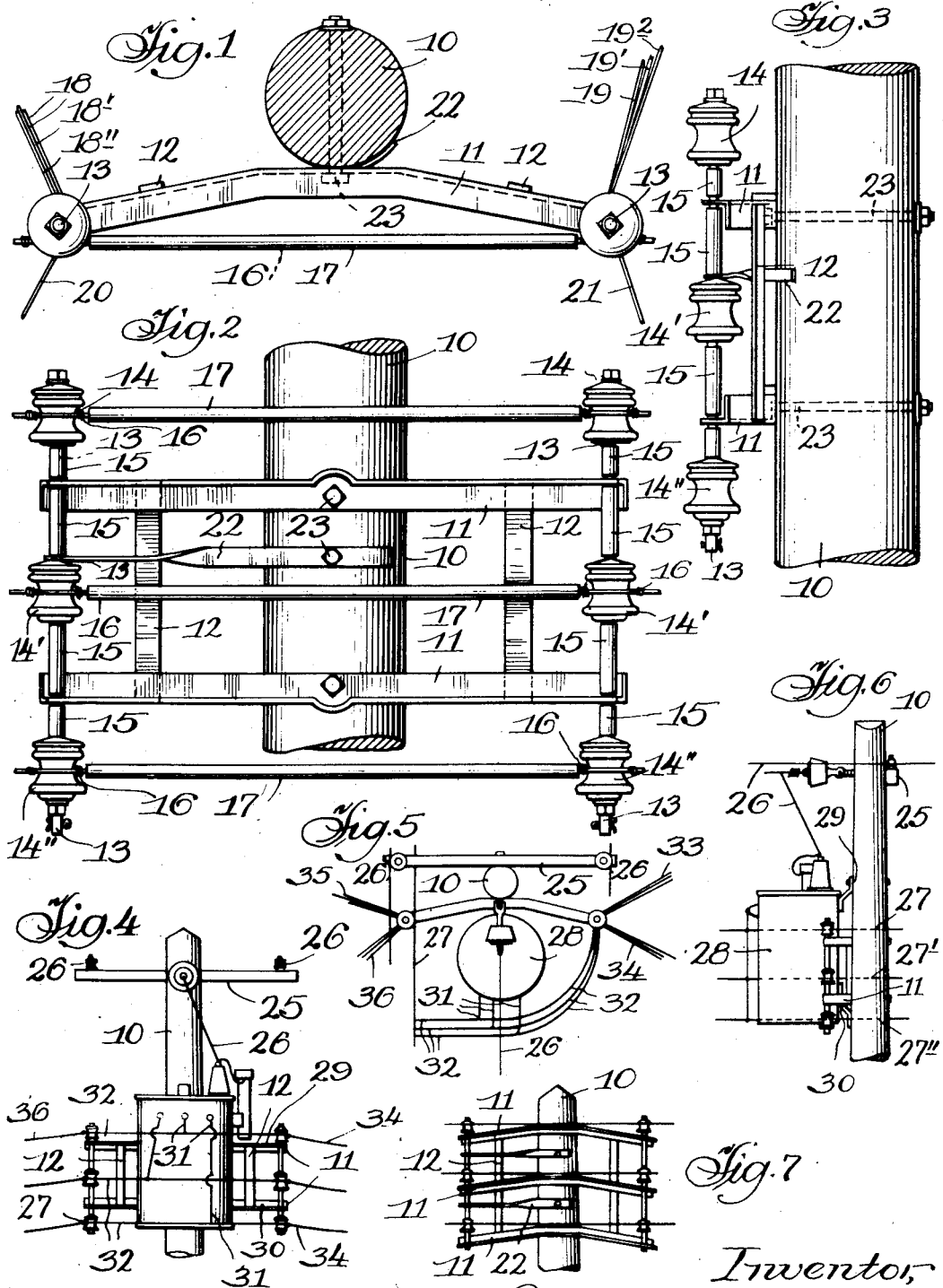
Oct. 10, 1939. R. H. MacKINNON 2,175,778
LINE-SERVICE RACK
Filed Nov. 12, 1937

2,175,778

UNITED STATES PATENT OFFICE 2,175,778

LINE-SERVICE RACK

Russell H. MacKinnon, Evanston, Ill.

Application November 12, 1937, Serial No. 174,231

3 Claims. (Cl. 179—149)

My invention relates to line-service racks for electrical distribution and transmission lines.

In most instances heretofore, the secondary conductors of a high tension distribution system have been carried on wooden cross arms bolted to so-called telephone poles. Where conductors extend from the poles to a house or houses to supply current for lighting, pumping or other power purposes, the said conductors or "service drops" leave the cross arm in groups in the same horizontal plane and necessarily cross each other near the said cross arms but with sufficient clearance to avoid contact. This presents an element of danger, as under extreme vibration the wires sometimes touch each other causing a short circuit.

One object of my invention is to avoid the danger of this contingency by providing an improved line service rack from which the service drops may extend in a vertical plane without crossing other line service drops.

Another object is to provide a line service rack of such construction and arrangement as to make it unnecessary for the lineman to climb between the wires to reach the primary wires above, as these and other connected wires are spaced from the pole on one side, making it possible for the lineman to climb the pole on the other side and more easily avoid contact with live and grounded wires.

A further object is to provide a line service rack so constructed that a transformer may be mounted near it on the pole, the installation providing a compact arrangement, permitting a shorter pole to be used than would otherwise be the case, even though the transformer is mounted below the secondary lines.

Another object is to provide means and a method for supporting the conductors in such a way as to reduce the vibration thereof and hence lessen the danger of breaking.

Other objects and advantages will be apparent from a consideration of the several commercial embodiments of the invention, illustrated in the accompanying drawing.

Fig. 1 of the drawing is a top plan view of a line service rack;

Fig. 2 is a front elevation thereof;

Fig. 3 is a side elevation thereof;

Fig. 4 is a front elevation of an installation comprising a line service rack and a transformer;

Fig. 5 is a top plan view thereof;

Fig. 6 is a side elevation thereof; and

Fig. 7 is a perspective view of a modified form of line service rack.

The rack shown in Figs. 1, 2 and 3 of the drawing, is mounted on a suitable pole such for example as the so-called wooden telephone pole 10, which, however, is used in this instance as a power line distribution pole. Such poles are made of any one of a number of other suitable materials. The rack itself comprises a plurality of cross arms 11 which are made preferably of steel and may consist of suitable lengths of angle irons bolted to the pole in the conventional manner and spaced vertically. It will be noted that each angle iron has two bends in it, as shown in Fig. 1, whereby a line connecting opposite ends of a single arm would be spaced away from the wooden pole a distance of several inches. The angle iron cross arms preferably face each other, i. e. the angle irons are so positioned that their horizontal flanges are separated the maximum distance. The advantage of this is increased strength and rigidity and symmetrical appearance. In Figs. 2 and 3 the line service rack is illustrated as having two such steel cross arms, although a larger number may be employed, as illustrated for example in Fig. 7. The cross arms, as shown in Figs. 1, 2 and 3, are connected by vertical spacing members 12, which are made preferably of strap steel, spot welded at the ends.

The straps 12 or vertical braces are not at the extreme outer ends of the horizontal cross arms but are spaced almost half way between the ends and the middle of the structure, as shown in Figs. 1 and 2. These braces may as an alternative be located on the inside of the angles and fastened with rivets, which construction involves a somewhat lower cost than the welding operation. Also the straps may be installed at an angle from the vertical, forming a trapezoid with the horizontal cross arms instead of a rectangle. Also rods, pipes or guys may be substituted for the straps.

At each end of the structure there is mounted a vertical bolt 13 carrying the desired number of insulators and spacers. In the arrangement shown, there are three spool insulators on each side, 14, 14' and 14'', separated by spacers of conducting or insulating material 15.

The three secondaries are fastened to the spool insulators in the usual manner and may extend at right angles to the steel cross arms or parallel thereto. In the drawing, Fig. 1 particularly, it will be seen that the secondary wires 16 are arranged substantially parallel to the cross arms, one over the other in substantially the same vertical plane. These three wires, as seen in Fig. 1, are spaced from the pole, and as the lineman can climb the side of the pole opposite to that on which said cross arms are mounted, the secondary lines are removed a safe distance from him. However, as a further precaution the spans between the insulators may be covered with rubber tubing 17, such as a split rubber hose.

The line service rack, it will be seen, is substantially rectangular in elevation with its ends in a plane spaced from the pole, and hence being somewhat concave when viewed from the top. The service drops are connected to the secondary lines at the insulators and there may be one or more groups of service drops taken off from each line bracket. In Fig. 1, four such groups are shown, 18, 19, 20 and 21. The three service lines 18, 18' and 18" are arranged substantially in the same vertical plane although they are shown displaced slightly in a horizontal direction in Fig. 1, to make them visible. Furthermore, they may be attached to insulators on a house, arranged in a horizontal row, so that the plane of the conductors shifts from vertical to horizontal as the service lines extend from the service rack to the house, and thus they may also appear somewhat as shown at 19, 19' and 19" in Fig. 1. It will be seen that the general arrangement is that of diverging groups of service lines which do not cross each other.

A tension member or brace 22 may be provided, if desired, having the form of a flat steel strap (see Fig. 2) with suitable holes at each end, installed on one of the vertical bolts 13, twisted a half turn, and curved at the other end, where it receives a bolt or spike 23. This tension member may be used where the stresses on the service rack tend to twist it on the pole, or where reinforcing of bolt 13 is desired, for heavy strains.

In Fig. 4 the pole has an additional cross arm 25 on it with two insulators on the cross arm and a third insulator on the pole, to which insulators the primary wires 26 of a three phase line are secured. The secondary conductors 27 in this case are mounted on the cross arms 11 in a plane at right angles to said cross arms instead of parallel thereto. These secondary conductors 27, 27' and 27" are shown more clearly in Fig. 6. The transformer 28 is mounted on the pole on suitable brackets 29 and 30, and spaced therefrom. Conductors 31 extend from the transformer to cross conductors 32 which lead to the insulators on the line service rack and to the service drops 33 and 34. Additional service drops 35, 36 are shown leading from the opposite ends of the line service rack, at various angles.

The arrangement just described provides a very compact installation and makes it possible to use a shorter pole than would otherwise be the case, even though the transformer is located below the secondary lines instead of substantially at the same elevation.

In Fig. 7 the pole 10 has three cross arms 11 mounted on it, the same being shown somewhat in perspective, to make the construction a little clearer. The same type of spool insulators and spacers are provided as in the form of device first described but the insulators in this case are each positioned slightly above the corresponding cross arm. Additional cross arms may, of course, be provided.

A line service rack of the construction shown in the several figures of the drawing has numerous advantages. In the old cross arm construction where three secondary conductors were employed, mounted on a cross arm, the service drops would extend from insulators on a second cross arm to the houses. This second cross arm would be arranged at right angles to the first cross arm and somewhat below the same, and the service lines would cross each other where two conductors extended from each insulator to two different houses on the same side of the pole line. Furthermore, service lines would be connected by jumpers extending from the insulators to the secondary lines somewhat above the same and would be connected to the secondary conductors at a point somewhat remote from the pole. Under these circumstances vibration of the long spans of the secondary conductors would be communicated to the jumpers, causing them to break off in time. This breakage difficulty is overcome in the improved method described herein, as all of the connections are made at a solid, substantially non-vibrating support. (See Fig. 5.)

Among other advantages the following may be mentioned:

A substantial climbing space, for example one of 36" in most cases, is provided by the new construction allowing the lineman proper clearance from all secondary line and service wires when he climbs or works below, through or above the secondary space on the pole. In the existing arrangement the service drops block the climbing space in a large percentage of cases. The secondary wires, in the new arrangement, can be completely covered opposite the climbing space with rubber hose, as there are no insulators in this space. A comparable arrangement can be obtained only with hoods or blankets on the cross arm construction under the old practice. Proper clearances can be maintained from the vertical primary wires (streamers) to transformers or other devices, regardless of the angle between the secondary line and the service wires. There is an improvement in the appearance of the line service rack arrangement as compared with the old arrangement in which the wires cross each other with little clearance.

The weight of the line service rack is less than that of the old six pin cross arm. Furthermore, it is easier to handle and install and involves less loading of the pole. The salvage value will be greater and the useful life longer.

The close spacing of the secondary wires which is possible, results in lowered impedance in the circuit, and this is especially important with existing and expected load conditions in normal and lightly loaded residential sections. Under present conditions, the starting of refrigerators and small appliance motors causes a flicker in the lights at 115 volts. Starting a half horse power motor or a larger one, on residential air conditioning systems and pumps causes a flicker at 230 volts. With the old cross arm construction it is necessary, therefore, to have one 14" spacing, one 46" spacing and one 60" spacing whereas with the rack construction and the neutral line at the top (or bottom) the spacing is two 8" spacings and one 16" spacing. Also, No. 4 copper conductors with line service racks are equivalent to No. 2 copper with cross arms.

The cost of the installation as compared with the nearest equivalent six pin cross arm installation, is substantially less.

The service rack construction makes possible closer spacing of insulators for cable secondary attachment at the pole, providing separation and service drop clearance is necessary, and this type of construction is of special advantage in heavy load areas.

The cross arms need not be straight, as viewed in elevation, as they are in Fig. 2, but they may be bent out of a horizontal plane, if desired.

I claim:

1. Transmission line supporting means comprising a plurality of cross arms adapted to be secured to a pole near the center of said arms, the two oppositely extending portions of each of said cross arms forming an obtuse angle with each other, the side of each of said cross arms which faces said pole being opposite said obtuse angle, connecting members secured to said oppositely extending portions to form a rigid rack, and insulators on said rack near the ends thereof.

2. A line service rack comprising a plurality of horizontal metal arms, vertical braces connecting the same intermediate the ends, a vertical member at each end of said arms, insulators and spacers mounted in superimposed relation on said vertical members, said metal arms being bent in a horizontal plane forming a concave rigid frame, and means for mounting said frame on a support with its concave side away from said support.

3. Transmission line supporting means comprising a plurality of cross arms adapted to be secured to a pole near the center of said arms, the two oppositely extending portions of each of said cross arms deviating from a straight line by a small angle, and extending away from said pole, vertical members secured to said oppositely extending portions to form a rigid rack, and insulators on said rack near the ends thereof, whereby conductors may extend in horizontal spans from the insulators on one end of said rack to those on the other end and clear said pole.

RUSSELL H. MacKINNON.